United States Patent Office 3,368,257
Patented Feb. 13, 1968

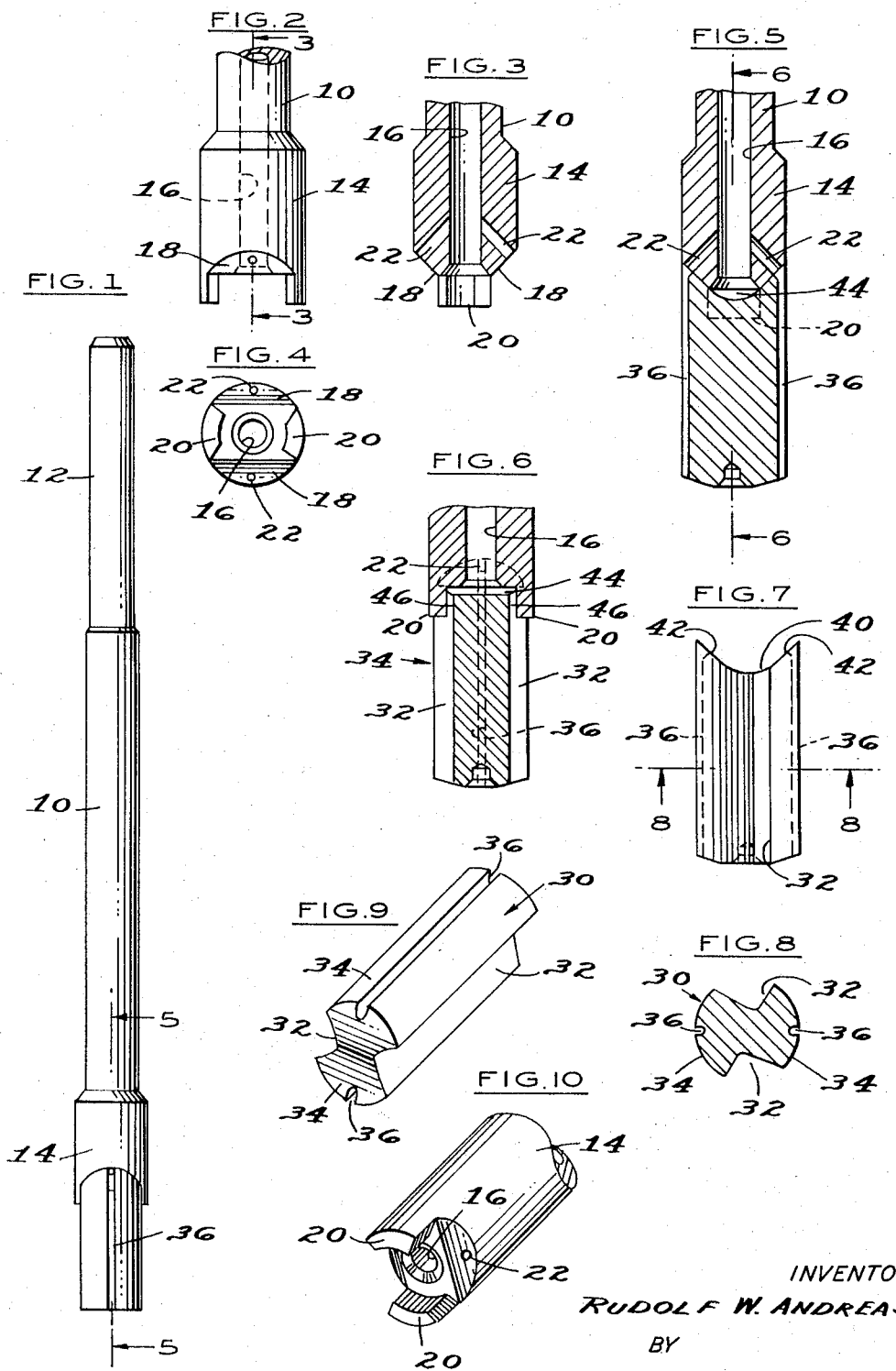

3,368,257
DEEP-HOLE DRILL AND REAMER
Rudolf W. Andreasson, 780 W. Maple Road,
Birmingham, Mich. 48009
Filed Feb. 9, 1966, Ser. No. 526,282
4 Claims. (Cl. 29—106)

This invention relates to a rotating metal removing tool such as a drill or reamer and is an improvement on that tool shown in my U.S. Patent No. 3,169,417, dated Feb. 16, 1965.

It has been found in connection with the brazing of a steel tool shank with a hardened wear tip such as carbide that there is sometimes a problem with cracking of the carbide which renders the assembly defective and unusable.

It is believed that this cracking develops from strains resulting from the brazing action which requires, of course, heating both the shank and the bit insert. More particularly, it is believed that some of the cracking develops as a result of the greater expansion of the steel shank in comparison with the carbide insert so that upon cooling, particularly if brazing material is trapped in undue quantities between the extended part and the insert, the contraction forces will cause the cracking of the carbide.

It is an object of the present invention to provide an improved construction particularly for two-fluted tools of the larger sizes wherein the brazing operation is much simpler to perform because the joints are exposed to the operator so that he can observe the flow of the material.

It is a further object to provide a construction which has the advantage of a mechanical interlock while creating a lubricant chamber which distributes lubricant from the lubricant channel in the crank shank to the main flute of the insert while making it very simple to provide coolant also for coolant channels formed in the wear surfaces of the insert. Briefly, this is accomplished by providing a V-shaped recess in the end of the bit insert extending diametrically, and shaping the walls of the driving shank to braze directly to the side walls of the V notch while providing a coolant chamber between the parts open directly to the main flute or flutes. In accomplishing this, there is obtained a mechanical drive interlock as well as directional control of the coolant at the working areas.

It is a further object to provide a tool design which is cheaper in construction because of the simpler machining operations involved in the formation of the parts.

Other objects and features of the invention as well as the manner of making and using the described construction will be apparent in the following description and claims wherein there is set out the best mode contemplated for carrying out the invention.

Drawings accompany the disclosure and the various views thereof may be briefly described as:

FIGURE 1, an elevation of the completed device.
FIGURE 2, an enlarged view of the working end of the shank.
FIGURE 3, a sectional view on line 3—3 of FIGURE 2.
FIGURE 4, an end view of the shank.
FIGURE 5, a sectional view of the assembly on line 5—5 of FIGURE 1.
FIGURE 6, a sectional view of the assembly on line 6—6 of FIGURE 5.
FIGURE 7, an elevation of the cutting bit of the assembly.
FIGURE 8, a sectional view on line 8—8 of FIGURE 7.
FIGURE 9, a perspective view of the shank end of the cutting insert.
FIGURE 10, a perspective view of the working end of the shank.

Referring to the drawings:

A reamer construction is shown wherein a shank 10 having a driving end 12 has a cutting head 14, in this instance, enlarged somewhat over the shank, the shank being provided with an axial coolant passage 16. The cutting end of the shank also has two walls 18 on each side of the shank converging toward the cutting end diametrically opposed to each other between two axially extending skirts 20 positioned at the outer diameter. The angled surfaces 18 also have drilled therein two short passages 22 which terminate at the central passage 16 to originate adjacent the top edge of the surfaces 18, substantially normal to these surfaces.

Turning now to the cutting bit or insert 30, this is a substantially cylindrical slug of material such as tungsten carbide commonly used as a cutting material, said bit having in this instance opposed flutes 32 of substantial depth extending from end to end. The lands 34 of the insert between the flutes are each provided with an axial slot 36, the purpose of which will be described later. The shank end of the bit is shown best in FIGURE 7 as having a V-notch 40 with diverging walls 42 which are angled to interfit with the walls 18 on the bit end of the shank. This V-notch extends diametrically across the bit insert and accordingly intersects the two flutes 32. The configuration of the bit end of the shank as shown best in FIGURE 10 indicates that the material between the skirts 20 is removed leaving these skirts as axial projections; and upon interfitting the bit with the shank, there is left a cross passage 44, FIGURE 6, which lies between the skirts 20 and connects with a downward passage 46 formed between each skirt 20 and the inner surface of each flute 32.

Thus, it will be seen that the coolant flow through the interior channel 16 will diverge in the cross passage 44 and flow axially straight down the guide passages 46 and the flutes 32, thus reaching the cutting edges on the flutes and at the end of the reamer. Also, in assembly, the diverging holes 22 will connect with the upper ends of the land grooves 36 as shown best in FIGURE 5.

In addition, in assembly, it will be appreciated that the interlock between the bit insert 30 and the shank will create a mechanical drive connection which greatly relieves any strain on a brazed joint between the parts. In addition, in the brazing operation after each part has been heated up to the brazing temperature, a contraction upon cooling will not put any undue strain on the carbide and thus the percentage of parts with a successful braze is greatly increased over previous designs. In addition, in the brazing operation itself, the metal can be seen readily flowing in the outside joints and accordingly the heating can be discontinued as soon as this is observed, thus reducing the temperature that the parts may ultimately reach.

Another advantage of the structure is that the interfitting shape of both the shank and the bit can be accomplished entirely by an open milling or grinding operation and there is no drilling and reaming required to interfit the two parts. The shaping that must be done in the carbide itself which is an extremely expensive operation is extremely simple to obtain. This can be obtained partially in the formation of the carbide bit itself and simply ground to proper dimension. It is believed that there is thus provided a combination of shank and bit insert which has all the advantages of previous designs with respect to drive interlock and coolant flow and numerous additional advantages as above described in connection with the manufacture and assembly and ultimate success of the device.

What is claimed as new is as follows:

1. In a rotary tool of the type utilizing a shank with an axial interior coolant passage and a bit bonded to the working end thereof,
    (a) an elongate bit having an alternate flute and land configuration between a cutting end and a shank end, the shank end having a V-shaped notch,
    (b) a shank having an axial, interior, coolant passage terminating at the bit end of the shank, the bit end being shaped to receive and interfit with the notched portion of the shank end of the bit, and having an axial, segmental skirt extension to enter and interfit with an outer segmental area of each flute of the bit to form a driving connection between the shank and bit,
        said notch forming with said bit a chamber adjacent each said skirt extension at the end of said coolant passage to distribute coolant to each flute in an axial direction as baffled by said skirt extension.

2. In a rotary tool of the type utilizing a shank with an axial interior coolant passage and a bit bonded to the working end thereof,
    (a) an elongate bit having an alternate flute and land configuration between a cutting end and a shank end, the shank end having a V-shaped notch, the bight of the notch extending transversely between the flutes and the legs of the V terminating at the lands and extending toward the shank end,
    (b) a shank having an axial, interior, coolant passage terminating at the bit end of the shank, the bit end being shaped to receive and interfit with the notched portion of the shank end of the bit, and having opposed axial, segmental skirt extensions to enter and interfit with an outer segmental area of each flute of the bit to form a driving connection between the shank and the bit,
        said notch forming with said bit a chamber between said skirts at the end of said coolant passage to direct coolant outwardly and thence downwardly as baffled by said skirts to flow axially along said flutes of said bit.

3. In a rotary tool of the type utilizing a shank with an axial interior coolant passage and a bit bonded to the working end thereof,
    (a) an elongate bit having an alternate flute and land configuration between a cutting end and a shank end, the shank end having a V-shaped notch, the bight of the notch extending tranversely between the flutes and the legs of the V terminating at the lands and extending toward the shank end,
    (b) a shank having an axial, interior, coolant passage terminating at the bit end of the shank, the bit end being shaped to receive and interfit with the notched portion of the shank end of the bit, and having opposed axial segmental skirt extensions to enter and interfit with an outer segmental area of each flute of the bit to form a driving connection between the shank and the bit, each skirt extension having a radial inward dimenion less than the depth of the flute into which it inserts, and interfitting portion of said shank having an axial dimension less than the axial depth of said notch to form a cross chamber between said skirts open centrally to said coolant passage and open axially to a passage between said skirts and said flutes to direct coolant axially down said flutes.

4. A device as defined in claim 3 in which said lands are provided with axial surface grooves extending from end to end, and said shank has divergent passages from said coolant passage to intersect said axial surface grooves at the tip of the sides of said V-shaped notch on the interfitting portion of said shank.

No references cited.

FRANCIS S. HUSAR, *Primary Examiner.*